UNITED STATES PATENT OFFICE.

RICHARD RYAN, OF CLEVELAND, OHIO, AND THEODORE SMITH, OF WHEELING, WEST VIRGINIA.

COMPOSITION FOR BRICKS, BLOCKS, POSTS, AND THE LIKE.

1,269,649. Specification of Letters Patent. Patented June 18, 1918.

No Drawing. Application filed January 21, 1918. Serial No. 212,888.

*To all whom it may concern:*

Be it known that we, RICHARD RYAN and THEODORE SMITH, citizens of the United States of America, and residents, respectively, of Cleveland, county of Cuyahoga, and State of Ohio, and Wheeling, county of Ohio, and State of West Virginia, have invented certain new and useful Improvements in Compositions for Bricks, Blocks, Posts, and the like, of which the following is a specification.

This invention relates broadly to a fireproof composition, and more particularly to a composition capable of being molded to form articles in which attaching nails may be driven.

The primary object of the invention is to provide an incombustible composition which may be readily molded into various shapes or forms as a substitute for wood, brick, concrete and the like.

A further object is to provide a composition of the character mentioned which is especially designed for employment in the formation of fence-posts and those parts or elements of building structures which are to receive nails or in which the use of attaching nails is advantageous, said composition being of a character which is not only readily penetrable by driven nails, but also effectually resists withdrawal of such nails when the latter have become seated therein.

Due to the friable character of nearly all hardened cementitious compounds readily receptive of driven nails which have heretofore been employed, wholly inadequate adhesion is thereby afforded for firmly retaining such nails in place therein. It is an important object of the present invention to provide a composition which possesses the requisite adhesive qualities for anchoring nails driven therein to the extent that withdrawal thereof, even under the application of force, is practically precluded.

The composition consists of certain materials or ingredients mixed together, preferably in about the following proportions, by volume:

| | |
|---|---|
| Slag | 28 parts. |
| Cement | 8 " |
| Asphaltum | 4 " |
| Rosin | 1 part. |

Slight variations in the proportions may be resorted to without changing the general character of or materially affecting the efficiency of the composition.

In preparing the above-named materials, the asphaltum is heated to a readily workable plastic state, and the slag, which is of the ordinary furnace variety, is heated to such a temperature that mixing thereof with the asphaltum will not chill or materially lower the temperature of the latter. Having mixed the slag and asphaltum, the cement is added and worked in to produce a semi-wet plastic mass, after which the rosin is introduced and thoroughly commingled with the pre-mixed materials. The mixture is then turned into molds to be shaped as desired.

When the molded composition has dried and hardened, nails may be readily driven therein or therethrough. The heat generated by the nail as it advances under the impelling force of repeated blows applied in rapid succession acts upon the rosin component to overcome the tendency of the latter to resist the advance of the nail. However, upon cooling of the so-heated rosin component engaged by the nail, there ensues such an intimate cohesive relation between the nail and the penetrated composition that the former is virtually anchored in place such frictional resistance being offered that withdrawal thereof can be effected only by the application of excessive, not to say a frequently destructive, force.

What is claimed is—

1. A composition comprising slag and cement mixed in about the proportion of seven volumetric parts of the former to two parts of the latter, a quantity of rosin approximating one-eighth that of the cement, and a carbonaceous binder for said materials.

2. A composition for use in building structures, comprising slag and cement united by a carbonaceous binding material, and rosin intimately mixed with said materials in a quantity approximating one-fortieth of the entire mixture, the volume of cement, rosin and binder combined approximating one-half that of the slag.

3. A composition consisting of the following materials mixed in about the proportions named:

| | |
|---|---|
| Slag | 28 parts. |
| Cement | 8 " |
| Asphaltum | 4 " |
| Rosin | 1 part. |

4. A plastic composition capable of being molded into bricks, blocks, and the like, composed of slag, cement, rosin and a suitable carbonaceous binding material, in which the proportion by volume of slag exceeds the cement, the cement exceeds the binder, and the binder exceeds the rosin.

In testimony whereof we affix our signatures in presence of two witnesses.
RICHARD RYAN.
THEODORE SMITH.

Witnesses:
ADOLPH FRANIC,
MICHAEL SCHUSTER.